UNITED STATES PATENT OFFICE.

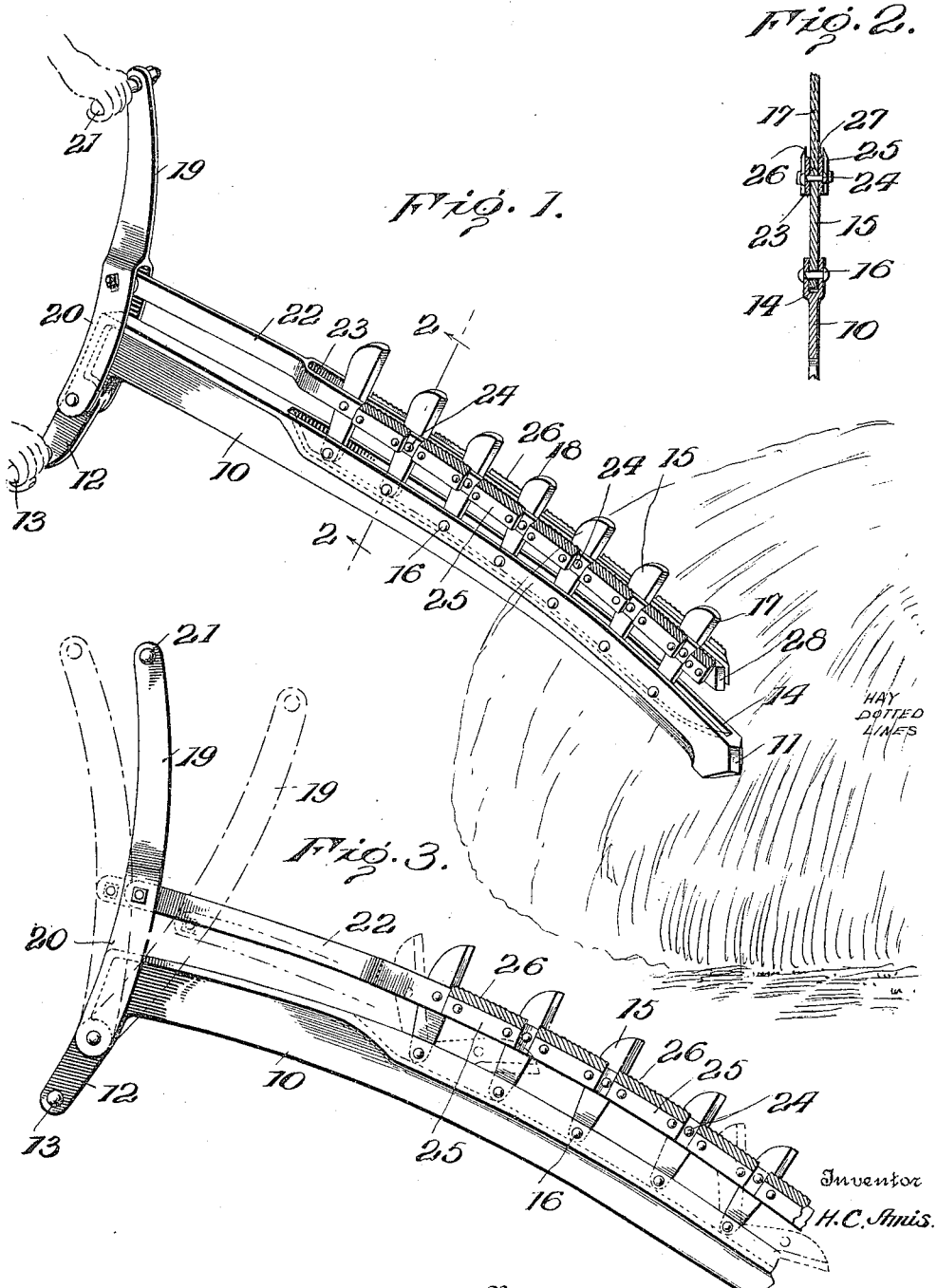

HENRY C. AMIS, OF STANFIELD, OREGON.

HAY-KNIFE.

1,224,436.  Specification of Letters Patent.  Patented May 1, 1917.

Application filed July 6, 1916. Serial No. 107,795.

*To all whom it may concern:*

Be it known that I, HENRY C. AMIS, a citizen of the United States, residing at Stanfield, in the county of Umatilla and State of Oregon, have invented certain new and useful Improvements in Hay-Knives, of which the following is a specification.

This invention contemplates an improved hay knife and has as its primary object to provide a device of this character so constructed that the use of the commonly employed jabbing stroke of the knife, to effect the cutting operation, will be eliminated.

The invention has as a further object to provide a device of this character employing a plurality of cutting blades which may be simultaneously operated to effect the cutting operation of the knife.

And a still further object of the invention is to provide a device of this character employing a plurality of work holding members arranged to coöperate with the cutting blades in such a manner that the hay will not slip away from said blades during the cutting stroke thereof.

Other and incidental objects will appear as the description proceeds and in the drawing wherein I have illustrated the preferred embodiment of the invention and wherein similar reference characters designate corresponding parts throughout the several views.

Figure 1 is a perspective view of my improved hay knife particularly showing the arrangement of the cutting blades thereof;

Fig. 2 is a sectional view taken on the line 2—2 of Fig. 1 and more particularly showing the mounting of the cutting blades as well as the mounting of the work holding members associated therewith; and, Fig. 3 is a fragmentary side elevation particularly showing, in dotted lines, the manner in which the cutting blades may be swung to effect the cutting operation of the knife.

In carrying out the invention, I employ a longitudinally curved stock 10 which, at its outer extremity, is sharpened to provide a cutting terminal 11 so that the stock thus provides an entering member. At its inner extremity the stock is formed with a laterally directed arm or head 12 upon one side of the outer extremity of which is arranged a handle 13. The stock 10 may be formed of metal or any other suitable material and is provided, upon its inner edge, with a longitudinally extending groove 14 extending throughout the major portion of the length of the stock. Mounted at their inner extremities, within the groove 14, are a plurality of cutting blades 15 which are arranged in a series spaced longitudinally of the stock to normally extend laterally therefrom and are connected to the stock by a plurality of pivot bolts or other suitable fastening devices 16. The lower faces of the blades 15 are beveled, at the outer extremities thereof, to provide cutting edges 17, while the upper edges of the said blades, at their outer terminals, are cut-away to provide curved faces 18, the purpose of which will presently appear. It is now to be observed that the blades 15 gradually increase in length from the lowermost blade, which is the shortest, to the uppermost blade, which is the longest.

Pivotally mounted upon the arm 12 of the stock, is an operating lever 19 which, at its inner extremity, is bifurcated to form spaced arms 20 freely embracing the stock and at its outer extremity is provided with a handle 21, the lever 19 extending from the stock 10 in a direction opposite to the arm 12. Attached to the lever 19, is an operating bar or member 22, the upper extremity of which is received between the arms 20 of the said lever and is pivotally connected thereto by a bolt or other suitable fastening device. The lower extremity of the said bar is bifurcated to form spaced arms 23 between which are freely received the blades 15 which are pivotally connected to the said arms by a plurality of bolts or other suitable fastening devices 24. Mounted upon the outer sides of the arms 23 to coöperate with the cutting blades 15, are a plurality of work holding members or plates 25, the upper edges of which are beveled inwardly toward the said blades and are serrated or otherwise formed to provide roughened biting edges 26, a pair of the said members being associated with each cutting blade. In order that the biting edges 26 of the work holding members 25 may be exposed in a manner to efficiently engage the work, the arms 23 of the operating member 22 are, as best shown in Fig. 2 of the drawing, provided upon the outer edges thereof with oppositely beveled faces 27 sloping away from the cutting blades 15 and toward the plates 25. At their lower ends, the arms 23 are beveled or otherwise provided with sharpened terminals 28 for cutting into the work.

In operation, the handle 13 is grasped by one hand of the operator and the stock 10 is forced downwardly into the hay, the handle 21 being, in the meantime, grasped by the other hand of the operator and the lever 19 operated to shift the cutting blades 15 upwardly to the extreme position shown in dotted lines in Fig. 3 of the drawing. In this connection, the purpose of the curved upper edges 18 upon the cutting blades 15, will become apparent since it will be seen that by so forming the said blades, the hay will readily ride over said curved edges to permit the upward movement of the blade. Having forced the stock 10 into the hay, as previously described, the lever 19 is then operated in a downward direction to the extreme position indicated in dotted lines in Fig. 3 for shifting the cutting edges 17 of the blades 15 downwardly between the biting edges 26 of the plates 25 to effect the cutting operation of the knife. Particular attention is now directed to the fact that the blades 15 are so mounted that the said blades may be shifted to move the entire length of the cutting edges thereof between the biting edges of the members 25 so that a clean shearing cut upon the hay may thus be had. Furthermore, it is to be observed that the work holding members 25 are so arranged that the biting edges 26 will efficiently hold the hay engaged by the blades 15 from slipping away from the said blades as the blades are shifted downwardly and since the cutting blades are gradually increased in length toward the uppermost blade, the purchase of the blades upon the hay will be gradually increased toward the loosest portion of the hay or that portion which was first severed.

It will, therefore, be seen that I provide a simple and efficient construction for the purpose set forth and a hay knife wherein the use of the commonly employed jabbing thrust of the knife, to effect the cutting operation thereof, is eliminated.

Having thus described the invention, what is claimed as new is:

1. A device of the character described including a stock, a series of cutting blades pivotally connected to the stock and spaced longitudinally thereof, the said blades gradually increasing in length from the lower most blade to the uppermost blade, and an operating member freely connected to the said blades for simultaneously shifting the blades relative to the stock.

2. A device of the character described including an elongated stock, a cutting blade pivotally connected at its inner extremity to the stock, and means having arms extending upon opposite sides of the blade intermediate the ends thereof and pivotally connected to the blade with the said means shiftable outwardly longitudinally of the stock to pivot the blade inwardly toward the stock and shift the cutting edge of the said blade between the said arms.

3. A device of the character described including a stock, a cutting blade pivotally connected at its inner extremity to the stock, an operating member pivotally connected to the blade intermediate the ends thereof, and a work holding member carried by said first mentioned member to extend longitudinally thereof in advance of the point of pivotal connection of the said operating member with the blade with the said operating member shiftable outwardly longitudinally of the stock to rock the blade inwardly toward the stock and move the free extremity of the blade past the said operating member and the said work holding member.

In testimony whereof I affix my signature.

HENRY C. AMIS. [L. S.]

Copies of this patent may be obtained for five cents each, by addressing the "Commissioner of Patents, Washington, D. C."